May 7, 1946.  J. BAILEY ET AL  2,399,615
LONGITUDINAL SLIPPER DIE FOR EXTRUDING ORGANIC PLASTICS
Filed Nov. 9, 1944  2 Sheets-Sheet 1
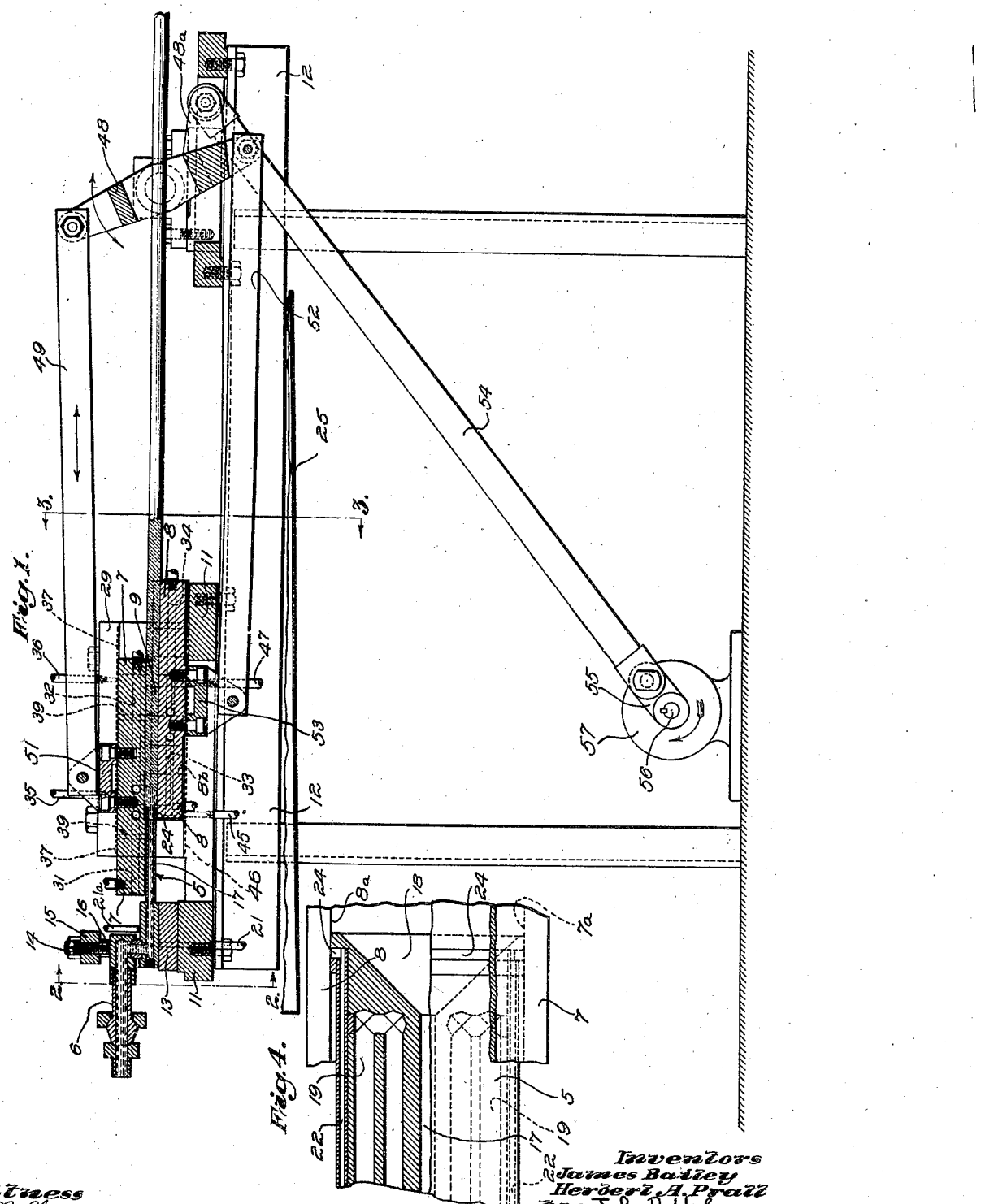

May 7, 1946.   J. BAILEY ET AL   2,399,615
LONGITUDINAL SLIPPER DIE FOR EXTRUDING ORGANIC PLASTICS
Filed Nov. 9, 1944   2 Sheets-Sheet 2
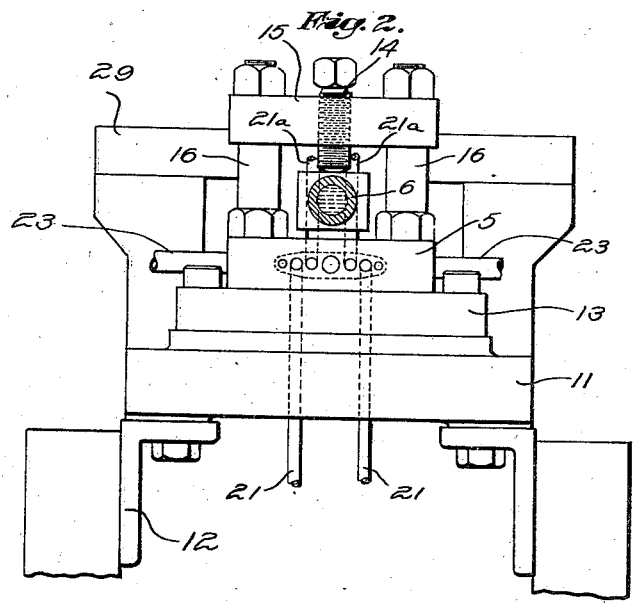
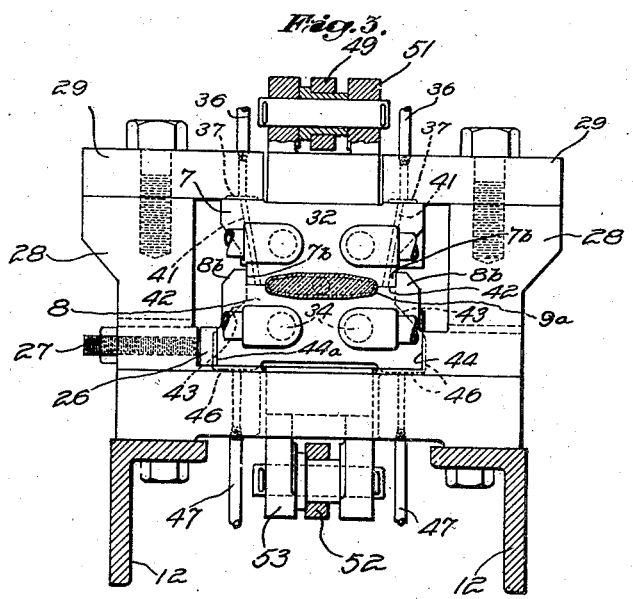
Inventors
James Bailey
Herbert A. Pratt
by John R. Hobson
Attorney Patented May 7, 1946

2,399,615

UNITED STATES PATENT OFFICE 2,399,615

LONGITUDINAL SLIPPER DIE FOR EXTRUDING ORGANIC PLASTICS

James Bailey, West Hartford, and Herbert A. Pratt, Hartford, Conn., assignors to Plax Corporation, Hartford, Conn., a corporation of Delaware Application November 9, 1944, Serial No. 562,666

4 Claims. (Cl. 18—12)

This invention relates to apparatus for forming shapes of organic plastic materials by extrusion and has particular relation to the extrusion of shapes, such as relatively thick shapes, which cannot be formed in ordinary extrusion dies because of excessive friction or sticking.

The general object of the invention is to provide a novel apparatus whereby sticking or friction of a shape in an extrusion die is overcome in a simple and practical way.

More specifically it is an object of the invention to provide a novel apparatus of the above kind for extrusion of shapes which are substantially hardened and made self-sustaining in the extrusion die in order that they may be accurately formed to the shape of the die, which apparatus is characterized by the provision of a split die, the parts of which are reciprocated longitudinally of the extruded shape and in opposite directions to each other during the extruding operation.

Another object of the invention is to provide a novel longitudinal slipper die for extruding organic plastics in which provision is made for maintaining a film of lubricant between the shape formed in the die and the die surfaces.

Other objects and advantages of the invention will be pointed out in the following specification or will become apparent therefrom, or from the accompanying drawings which illustrate an embodiment of the invention, and in which drawings:

Figure 1 is a view in longitudinal sectional elevation of the novel apparatus;

Fig. 2 is a view of the apparatus in rear sectional elevation taken approximately on the line 2—2 of Fig. 1, looking in the direction of the arrows;

Fig. 3 is a view in transverse section taken approximately on the line 3—3 of Fig. 1, looking in the direction of the arrows; and Fig. 4 is a partial view in horizontal sectional top plan of the extrusion nozzle and associated die members.

Referring now to the drawings, it will be seen from Fig. 1 that organic plastic material is received by the nozzle 5 from a pipe 6 and discharged from the nozzle between longitudinal slipper die members 7 and 8 between which the shape 9 is formed in die opening 9a. The plastic material may be supplied in heated condition by a suitable ram or stuffer (not shown).

The nozzle 5 and the slipper die members 7 and 8 are supported by a bed plate 11 bolted to a frame 12, as shown. The nozzle 5 is bolted to a block 13 which in turn is secured to the rear end of the bed plate 11, and the pipe 6 is clamped to the nozzle by a screw 14 in clamp 15 on studs 16, Fig. 2, in the block 13.

The nozzle 5 contains a central passage 17, Figs. 1 and 4, for the plastic material, which passage terminates in a widely diverging jet 18 at the discharge end of the nozzle and which serves to spread the plastic material as it leaves the nozzle to distribute it across the die opening 9a.

The temperature of the plastic material in the central passage 17 may be controlled by a suitable fluid heat transfer medium circulated through U-shaped passages 19, Fig. 4, at each side of the passage 17, the medium being conducted to and away from the nozzle through pipes shown partially at 21 and 21a, Figs. 1 and 2.

The nozzle 5 also has conduits 22 associated therewith for conducting a fluid lubricant to the end of the nozzle. The conduits 22 receive lubricant from supply pipes 23, Fig. 2, extending from opposite sides of the nozzle and discharge the lubricant into a groove 24 formed on the exterior of the discharge end of the nozzle, as shown in Figs. 1 and 4. This results in the lubrication of the exterior of the nozzle, the die surfaces and the surface of the plastic shape formed in the die. The die members 7 and 8 embrace the nozzle 5 and the surfaces 7a and 8a, which nozzle 5 is shaped to fit, slide back and forth on the nozzle at all times and receive lubricant from the groove 24 and cause it to be distributed as a continuous film over the surface of the plastic shape. The lubricant may escape at both ends of the die members and drop into a drip pan 25.

Longitudinal slipper die members 7 and 8 preferably re interfitted, as shown in Fig. 3, the upper member 7 sliding on the lower member and the lower member 8 being provided with spaced vertical guides 8b which engage the lower sides 7b of the upper member. The die opening 9a is shown as formed half within one die member and half within the other although this is not always necessary. This opening may be any of various shapes and in the illustrated embodiment is so designed as to form a thick strip having tapered edges.

The bottom die member 8 slides in the bed plate 11, provided at one side with an adjustable gib 26, lateral adjustment of which is effected by means of screws 27 (one only being shown) in one of the sides 28 of the bed plate.

The upper die member 7 is held in sliding engagement with the lower die member 8 by means of gibs 29 bolted to the tops of the sides 28 of the bed plate 11 and slidably engaging the top edges of die member 7.

Means are provided for effecting a transfer of heat between the slipper die members 7 and 8 and the plastic shape which is formed between them. Preferably, exchange of heat is effected in a plurality of zones formed lengthwise of the die members. In the illustrated embodiment, a heat transfer medium is circulated through the rear end of the slipper die member 7 through passages indicated at 31 and a separate heating medium may be independently circulated through the front portion of this die member through passages indicated at 32. Similarly, separate heat transfer media may be circulated through the rear and forward portions of the die member 8 through independent passages indicated respectively at 33 and 34. Thus, the cooling or heating effect of the rear portions of the die members may be different from or the same as the forward portions of said members.

Preferably, the sliding surfaces of the die members are lubricated to permit them to reciprocate freely. As shown in Figs. 1 and 3, lubricant may flow through pipes 35 and 36, in the rear and forward ends of the gibs 29, into grooves 37 formed on the bottom surfaces of gibs 29 to lubricate the top sliding surfaces of die member 7. Each groove 37 registers with, and delivers lubricant downwardly through, passageway 39 extending through the entire thickness of die member 7 to the bottom side thereof in order to discharge the lubricant into the die joint at 42 where the die member 7 slides on member 8. From the die joint 42 the lubricant may flow outwardly and downwardly through drains 43, Fig. 3, between the flanges 8b on die member 8. The intergaging surfaces of the slide member 8 and the bed plate at 44 and 44a receive lubricant from grooves 46 in the bed plate and having supply pipes 45 and 47 connected thereto.

The die members 7 and 8 are reciprocated in opposite directions by the oscillation of a crank 48 journaled on the frame 12 and connected by an upper link 49 and bracket 51 to the upper die member 7 and by a lower link 52 and bracket 53 to the lower die member 8. The crank 48 is rocked by means of a link 54 connected at its upper end to the arm 48a of the crank and at its lower end to a crank 55 on drive shaft 56 of motor 57. It will be seen that these connections are such that the die plate members must be reciprocated in opposite directions.

The operation of the novel apparatus is as follows. Hot organic plastic material is delivered to the nozzle 5 and discharged from the diverging jet 18 into the die opening formed in the die members 7 and 8. The material, which may be delivered to the pipe 6 from a suitable ram or stuffer (not shown) may be heated to or near working temperature in advance of pipe 6 and its temperature regulated in nozzle 5. The material flows out of the nozzle into and through the die opening 9a and the shape of the die opening is imparted thereto by pressure while stiffening of the material is effected by transfer of heat, as by the application of a cooling medium in the case of a thermoplastic material or of a heating medium in the case of a thermosetting material. As the material is shaped, a film of lubricant is maintained between it and the die surface by the discharge of oil from conduits 22 through groove 24 onto the inner die surfaces 7a and 8a of the die members. Reciprocation of the members greatly reduces frictional resistance to the passage of the plastic material through the die and also insures that the lubricant will be spread over the material in the form of a film to prevent sticking.

Considerable back pressure may be maintained in the die opening without sticking because of the above-described provisions for lubricating and for reciprocating the die members. This helps to prevent the formation of voids or bubbles in the extruded shape and to insure that the shape will be an accurate reproduction of the shape of the die opening. The shape preferably is hardened sufficiently to be self-sustaining and to make it unnecessary to further shape material after it leaves the die.

The plastic material preferably is caused to flow through the apparatus continuously as by delivering it from a screw stuffer rather than by means of a reciprocating ram.

The apparatus is especially useful in forming shapes of substantial thickness from such organic plastic materials as polystyrene and polymethyl methacrylate which require heating to very high temperatures and the use of high pressures to permit satisfactory shaping and which consequently have a strong tendency to stick to the die surfaces and to build up great resistance against extrusion pressure.

Having thus described the invention what we desire to claim and secure by Letters Patent is:

1. Apparatus for extruding a shape of organic plastic material comprising a nozzle, a pair of die members shaped to fit on and embracing said nozzle, means supporting said die members and nozzle in horizontal position and in alignment with each other, said die members having a die opening formed therein, guides on one of said die members fitting on the other of said die members in sliding engagement therewith, and means for simultaneously reciprocating said die members in opposite directions respectively.

2. Apparatus for extruding organic plastic material comprising a horizontal extrusion nozzle, a two-part die associated with said nozzle, said die comprising upper and lower members shaped to fit on and embracing said nozzle and having an opening therein to form the plastic material to the desired shape, means including a bed plate for holding said nozzle and said members in alignment, guide means on the bed plate for slidably supporting the lower die member and guide means on the lower die member for slidably supporting the upper die member, means for applying a lubricant between said nozzle and said die members, means for applying a lubricant to the contacting surfaces between said die members, means for applying a lubricant between the bottom die member and said bed plate, and means for reciprocating said die members in opposite directions longitudinally of said nozzle.

3. Apparatus for forming a shape of organic plastic material by extrusion comprising an extrusion nozzle, a two-part die comprising members shaped to fit on said nozzle and having a die opening formed therein, a bed plate having guides thereon slidably engaged by one of said die members, guides on the last-named die member slidably engaged by the other of said die members, means rigidly connected to said base plate and engaging the last-named die member for holding it in sliding engagement with the other of said die members, and means for simultaneously reciprocating said die members in opposite directions respectively longitudinally of the shape formed therein.

4. Apparatus for extruding organic plastic material which comprises a horizontal extrusion nozzle, upper and lower die members shaped to fit on and embracing said nozzle and having a die opening formed therein, said nozzle having the cross-sectional shape of said die opening, means for mounting said members in sliding engagement with said nozzle, means for holding the upper die member in sliding engagement with the lower die member, means for simultaneously reciprocating said die members in opposite directions respectively longitudinally of the nozzle, and means for maintaining a film of lubricant on the inner surfaces of the die members.

JAMES BAILEY.
HERBERT A. PRATT.